United States Patent

[11] 3,540,586

[72] Inventor Peter Henshaw Bailey
 Huddersfield, England
[21] Appl. No. 828,797
[22] Filed May 5, 1969
[45] Patented Nov. 17, 1970
[73] Assignee L.B. Holliday & Company Limited
 Huddersfield, England
 a British company
[32] Priority May 9, 1968, Oct. 24, 1968
[33] Great Britain
[31] Nos. 22009/68 and 50525/68

[54] FILTRATION APPARATUS AND METHOD
 4 Claims, 18 Drawing Figs.
[52] U.S. Cl. .................................................. 210/65,
 210/350
[51] Int. Cl. ...................................................... B01d 29/36
[50] Field of Search ........................................... 210/65, 350

[56] References Cited
UNITED STATES PATENTS
3,387,630 6/1968 Rouston .................. 210/350X Primary Examiner—J.L. DeCesare
Attorney—William R. Liberman ABSTRACT: A filtration apparatus is provided which comprises a housing with a cylindrical inner wall and an axially movable cylindrical core within the housing. A flexible tube diaphragm is located within the annular cavity between the core and housing and is operated by the action of pressure fluid on its outside surface relative to the core. A mixture of solid and liquid media to be separated is fed into the annular space between the diaphragm and the outside of the core and the pressurized diaphragm is used to expel residual liquid from the cake deposited on the core. The mounting and movability of the core within and out of the housing allows ready removal of the filter cake and permits continuous operation of the filtration apparatus.

INVENTOR
PETER HENSHAW BAILEY
BY
William R. Liberman
ATTORNEY

FILTRATION APPARATUS AND METHOD

This invention relates to filtration apparatus for the separation of a solid medium from a liquid medium.

According to one aspect of the present invention we provide a filtration apparatus for the separation of a solid medium from a liquid medium, the apparatus comprising a housing with a cylindrical inner wall; a cylindrical core axially movable through an opening at one end of the housing from an inoperative position outside the housing to an operative position within the housing in which an annular space is defined between the core and the inner wall; a flexible tube diaphragm within the annular space, the ends of the diaphragm being sealably secured to the ends of the inner wall to provide a pressure chamber between the inner wall and the outside surface of the diaphragm; closure means cooperable with the core and the housing or diaphragm to produce pressure-tight peripheral seals at the ends of the annular space in the operative position of the core; drainage ports in the core; an inlet for the media to be separated feeding into an end of the annular space and between the inside surface of the diaphragm and the outside of the core; a liquid medium outlet leading from the interior of the core through the housing; an inlet leading through the housing into the pressure chamber to allow a pressurised fluid to exert pressure on the outside surface of the diaphragm; and an outlet leading from the pressure chamber through the housing to allow the fluid pressure in the chamber to be released.

According to another aspect of the present invention we provide a method of separating a solid medium from a liquid medium, comprising the steps of providing filter medium on the outside surface of a cylindrical core which is mounted so as to be axially movable from an inoperative position outside a housing with a cylindrical inner wall; to an operative position within the housing in which an annular space is defined between the core and the inner wall and closure means cooperate with the core and the housing to produce pressure-tight peripheral seals at the ends of the annular space; the ends of a flexible tube diaphragm being secured in pressure-tight manner to the ends of the inner wall to define a pressure chamber between the wall and the diaphragm in the operative position of the core; moving the core into its operative position; feeding the media to be separated into an end of the annular space and into an inlet chamber defined between the inner side of the flexible diaphragm and the outer side of the filter medium; allowing fee drainage of liquid from the inlet chamber through the filter medium and drainage ports in the core to a liquid outlet; feeding fluid under pressure into the pressure chamber to apply pressure to the outer side of the flexible diaphragm and to compress the media in the inlet chamber between the flexible diaphragm and the filter medium so as to force additional liquid medium through the filter medium and the drainage ports to the liquid outlet, the solid medium being retained by the filter medium; releasing pressure in the pressure chamber when a desired amount of liquid has been filtered off under pressure; and moving the core with its adhering solid medium to the inoperative position of the core to allow removal of the solid medium.

The closure means which provide the pressure-tight seals may be separate from the core and housing and held between them in the operative position of the core or they may be provided on the core or the housing or on both the core and the housing. In one particular case a closure member is provided at the leading end of the core which first enters within the housing to effect a seal against an end plate at the corresponding inner end of the housing when the core is in its operative position and a closure member at the trailing end of the core is then in sealing contact with the diaphragm at the corresponding outer end of the housing. As regards the latter seal, the closure member may alternatively be provided at the outer end of the housing instead of at the trailing end of the core.

Conveniently, sealing members at the ends of the core have deformable lips which in the operative position of the core are pressed against the cooperating end plate and the diaphragm to achieve the pressure-tight seals.

The invention is now described in detail with reference to the accompanying drawings in which.

The filtration apparatus of FIGS. 1 to 6 comprises a cylindrical core 1 and an enclosing housing 2 with a cylindrical inner wall. The core and its housing are mounted via bushings 4 on a hollow shaft 3 coaxially therewith. The housing 2 is fixed and the core is axially movable on the shaft between an inoperative position outside the housing and an operative position within the housing.

Figure 1:
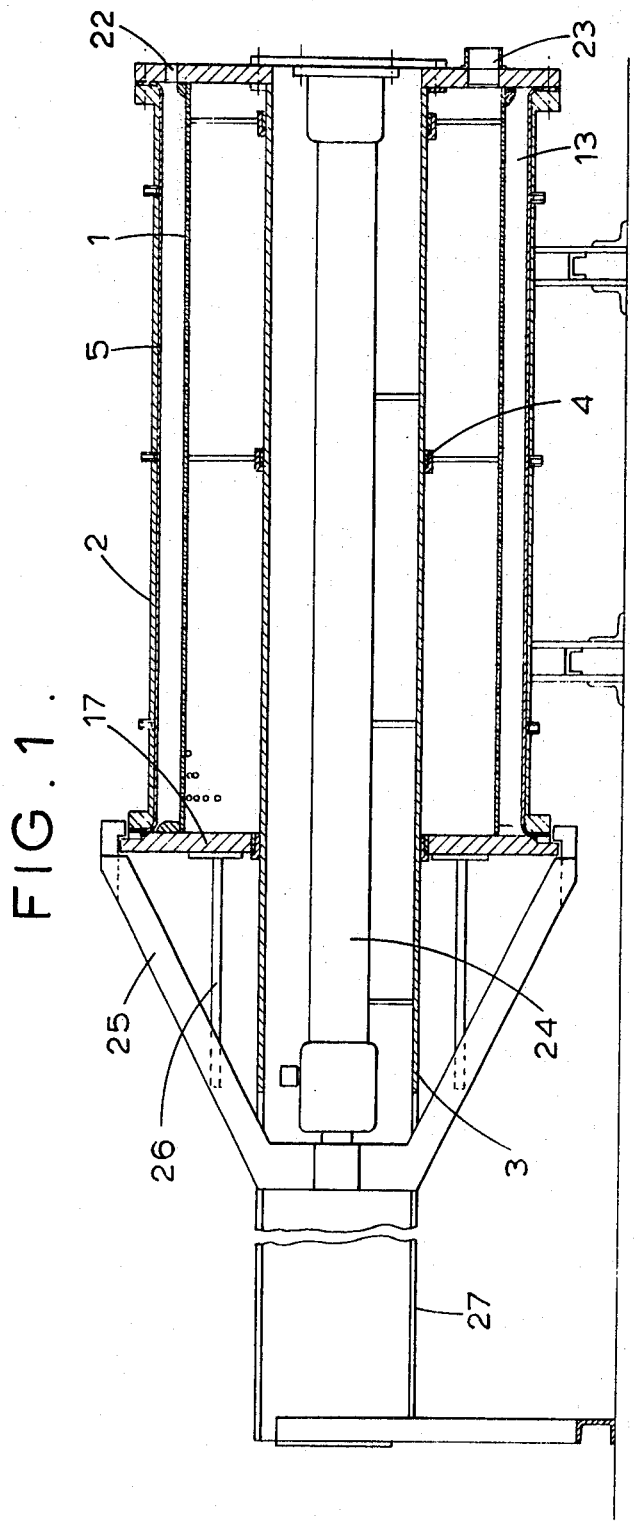
FIG. 1 is an aerial section (along the line I–I in FIG. 2) of one constructional form of filtration apparatus according to the invention.
Figure 2:
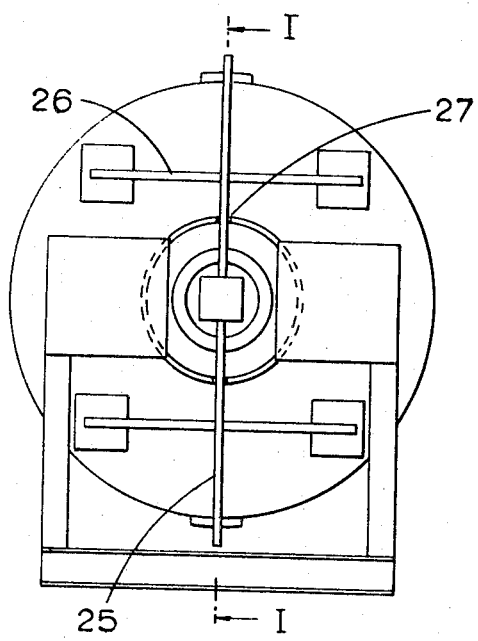
FIG. 2 is a corresponding end view.
Figure 3:
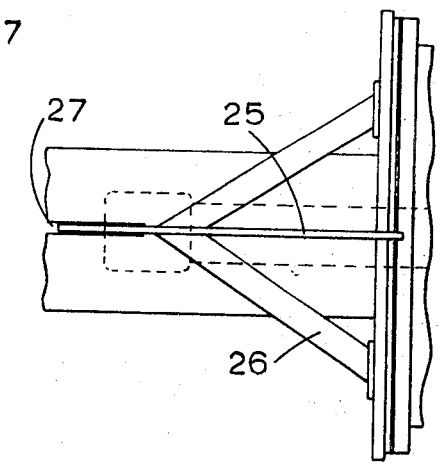
FIG. 3 is a fragmentary plan view corresponding to FIGS. 1 and 2.
Figure 4:
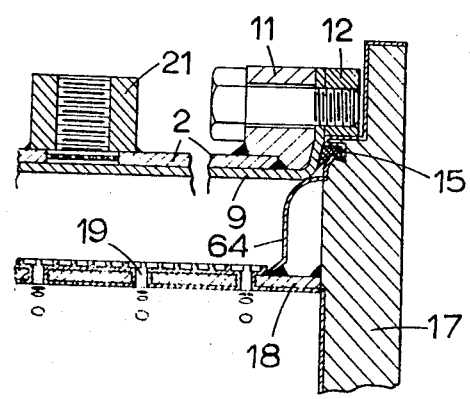
FIGS. 4 to 6 are detail views of the apparatus of FIGS. 1 to 3 (FIG. 5 showing a detail of the right-hand end of FIG. 7)
Figure 5:
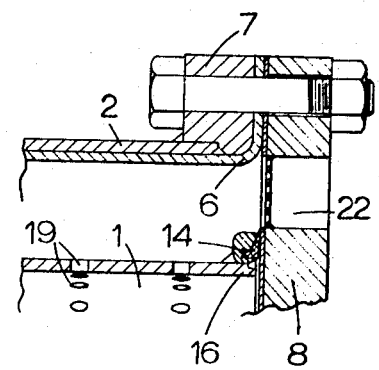
Figure 6:
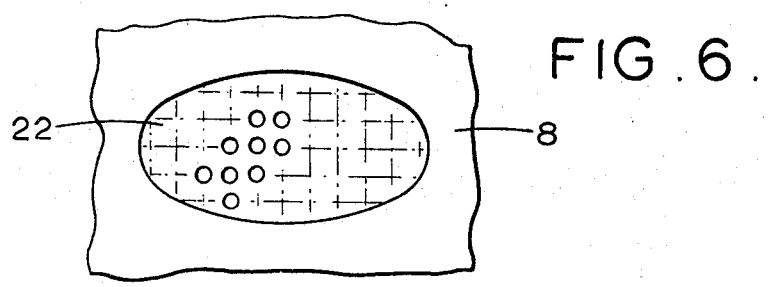
Figure 10:
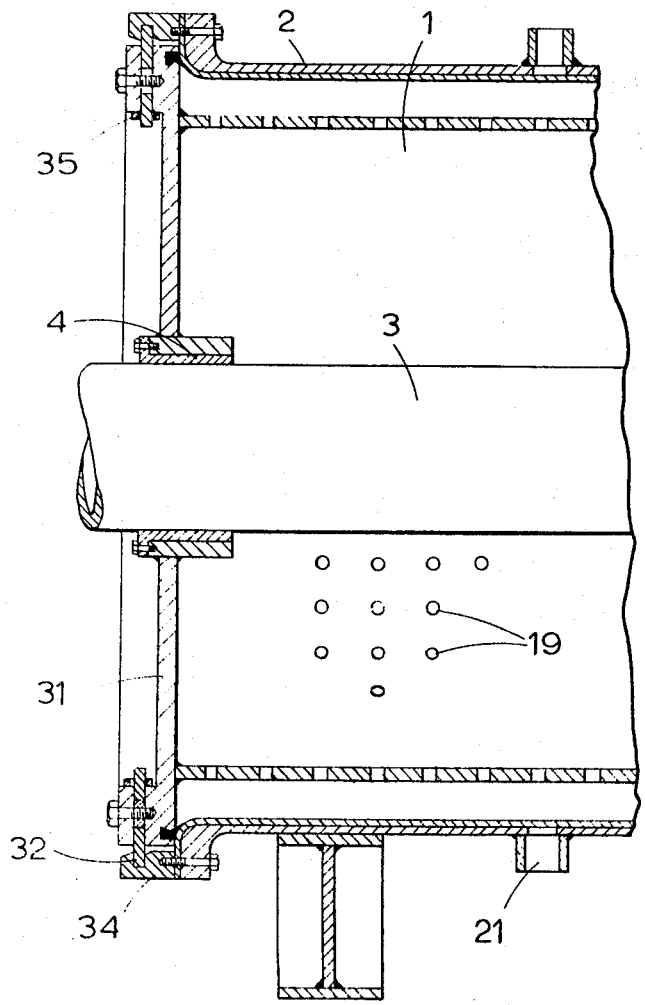
FIG. 10 is a partial axial section of a modification of the apparatus of FIGS. 1 to 6.
Figure 7:
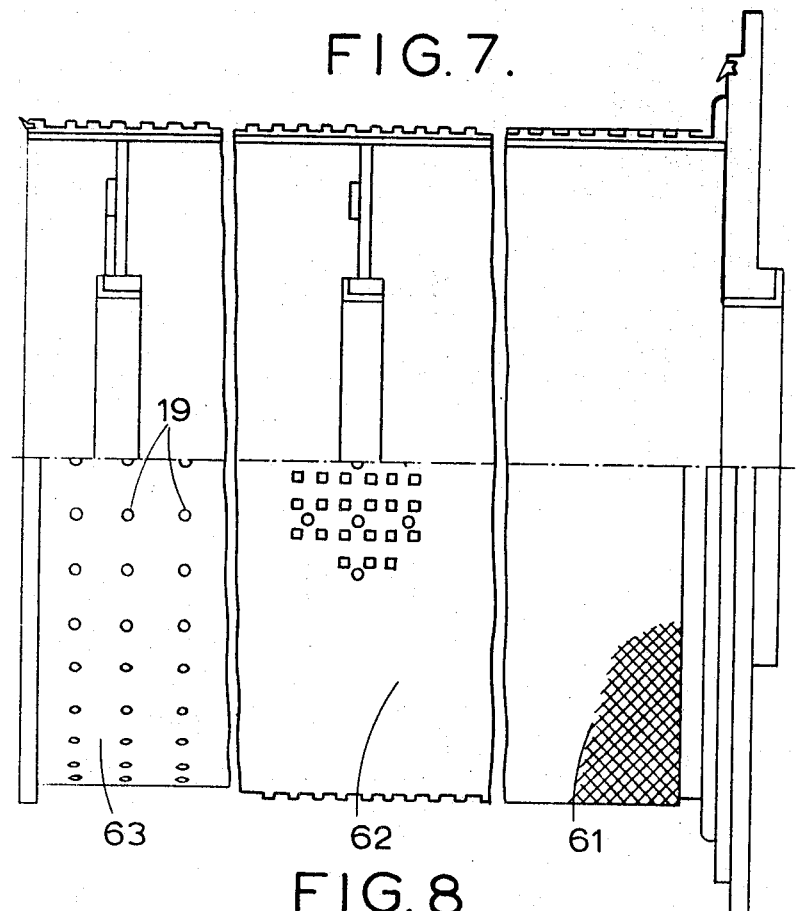
FIG. 7 is a highly diagrammatic view of the filter of FIGS. 1 to 6 illustrating structural detail.
Figure 8:
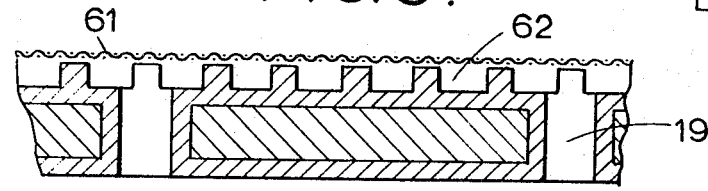
FIG. 8 is a fragmentary enlarged view taken at the middle of FIG. 7.
Figure 9:
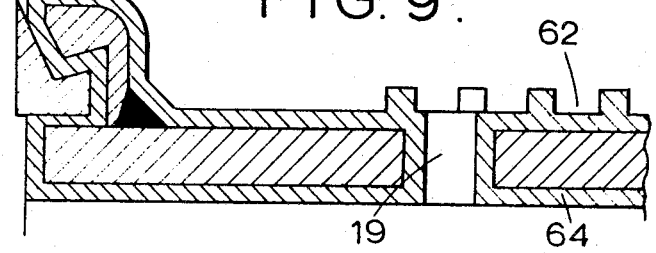
FIG. 9 is a fragmentary enlarged view at the left-hand end of FIG. 7.
Figure 11:
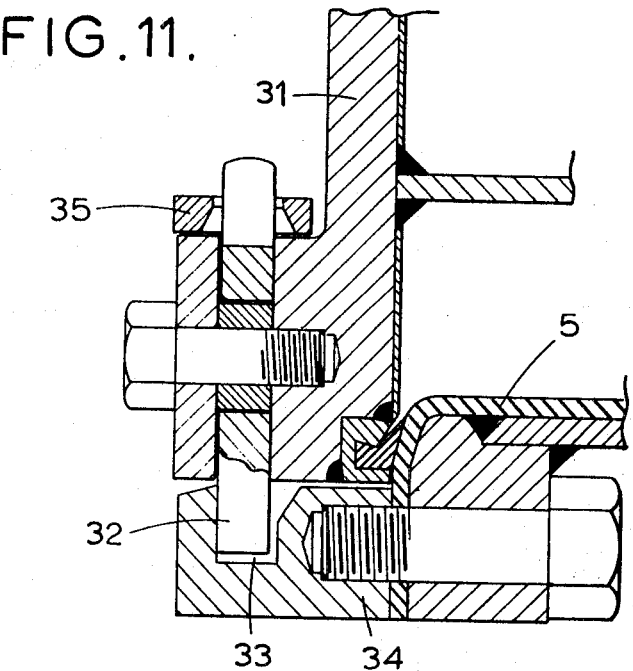
FIGS. 11 to 13 are detail views of the apparatus of FIG. 11, FIG. 11 being a section along the line XI–X1 in FIG. 12.

The core 1 is dressed with a tubular filter cloth 61 (FIGS. 7 and 8) which is held in position at its ends by means of rubber O-rings (not shown) or, for example, braiding of water-resistant plastics material such as nylon or terylene (not shown). Various filtering media other than filter cloths may be used and in some cases it may be desirable to precoat the filter medium with a filter aid such as diatomaceous earth, carbon or other filter aids, for example, when the apparatus is used in clarification.

A flexible diaphragm 5 of rubber, neoprene, polypropylene, Viton (trade mark) or other suitable rubber or rubberlike material, which may be reinforced if desired and is also of substantially tubular shape, is secured at its ends to the inner cylindrical wall of the housing 2. Viton is a fluoroelastomeric hydrocarbon rubber. At one end of the housing, the corresponding end 6 of the diaphragm 5 is held between a flange 7 on the housing 2 and an end plate which is bolted onto the flange 7. The other end 9 of the diaphragm is held between a corresponding flange 11 on the housing and an end ring 12 which is bolted to the flange 11.

The operative part of the filtration apparatus is constituted by an annular space 13 which is defined between the outside of the filter cloth (not shown) and the inside of the diaphragm 5 when the core 1 is in its operative position within the housing 2.

Peripheral seals are established for the annular space by moulded sealing rings 14 and 15 embedded in the core and cooperating one (14) with the housing and the other (15) with the housing via the diaphragm. Both sealing rings act by means of deformable lips which are deformable upon pressure contact with the cooperating sealing faces to produce the desired peripheral pressure-tight seals for the annular space 13.

The ring 14 is mounted at the right-hand end 16 of the core 1 (FIGS. 1 and 5) and its sealing lip abuts against the inside face of the end plate 8 of the housing when the core 1 is in its operative position. The sealing ring 15 is mounted within a frustoconical head 17 at the left-hand end 18 of the cylindrical core (FIGS. 1 and 4) and its deformable lip is arranged to abut against the diaphragm 5 at a location where the diaphragm contacts the root of the corresponding flange 11 on the housing 2.

The core 1 is provided with a plurality of drainage ports 19 extending through its walls into the interior of the core and annular grooves 62 and axial grooves 63 are provided in a rubber sleeve 64 forming the outside surface of the core 1 to enable liquid to pass through the filter cloth and along the surface of the core into the drainage ports 19.

An inlet 21 is provided to the housing which extends through its lateral wall and allows external fluid pressure to be applied to the outside surface of the diaphragm 5 so as to deform the diaphragm inwardly in the operation of the apparatus. Either water or compressed air may be used for this purpose.

A pair of inlets 22 (FIG. 6) for the slurry to be filtered are provided in the fixed end plate 8 of the housing and an outlet for separated liquid is provided in the same end plate. The number of such inlets and outlets may be varied as desired and in accordance with the feed and washing systems used and the arrangement for disposing of undesired liquid or alternatively collecting liquid product.

The inlet 21 for applying pressure to the diaphragm and the feed inlet, 22 to the space 13 are provided with screens to protect the diaphragm 5.

The cylindrical core 1 is movable by a ram 24 acting through arms 25 which exert a pull on the head 17 of the core when the ram 24 is extended by hydraulic pressure. Two pairs of arms 26 push the core head 17 back when the ram 24 is retracted to close the housing. The hydraulic pressure maintains the sealing contact between core and housing. The shaft 3 is slotted at 27 to allow movement of the arms 25.

Figure 12:
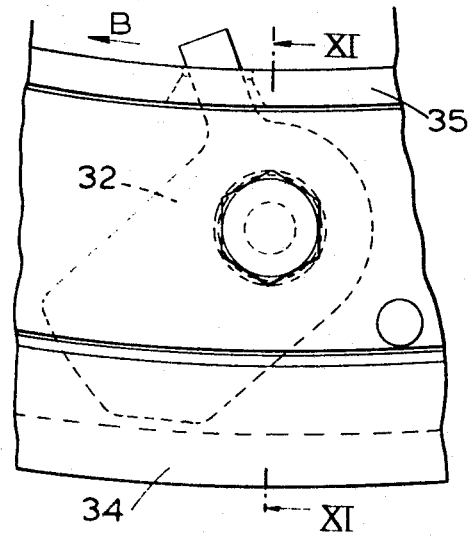
Figure 13:
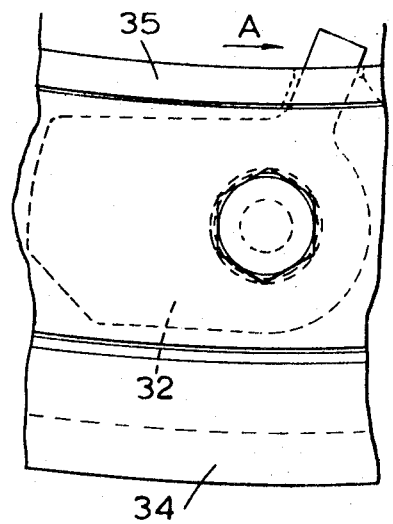

In the apparatus of FIGS. 10 to 13, the head 31, of the movable core 1, is locked in position in sealing contact with the diaphragm 5 by a locking device comprising pawls 32 mounted on the head 31 and engaging in their operative positions within a groove 33 in an end ring 34 of the housing 2. A ring 35 is manually displaceable in the direction A to an inoperative position (FIG. 13) in which the toggles are oscillated to positions in which they are withdrawn within the core head allowing free withdrawal of the head when the core is withdrawn from the housing. When the core has been returned within the housing, movement of the ring 35 in the opposite direction B locks the head 17 (FIG. 12).

When the core is hydraulically operated, the hydraulic ram or rams are designed to exert sufficient pressure to make the quick acting closing device just described unnecessary (as explained with reference to FIGS. 1 to 6).

To assist in drainage, the apparatus is preferably slightly inclined away from the horizontal so as to slope downwardly in the direction towards the drainage port 23 in the housing end plates.

The materials of construction of the apparatus may be varied in accordance with the mixture to be treated. Cast iron or mild steel which may if desired by lined with rubber or with stainless steel or other suitable alloys may be used. Mild steel is usually rubber or stainless steel-lined or Penton (trade mark)-coated Penton is a chlorinated polyester.

Figure 14:
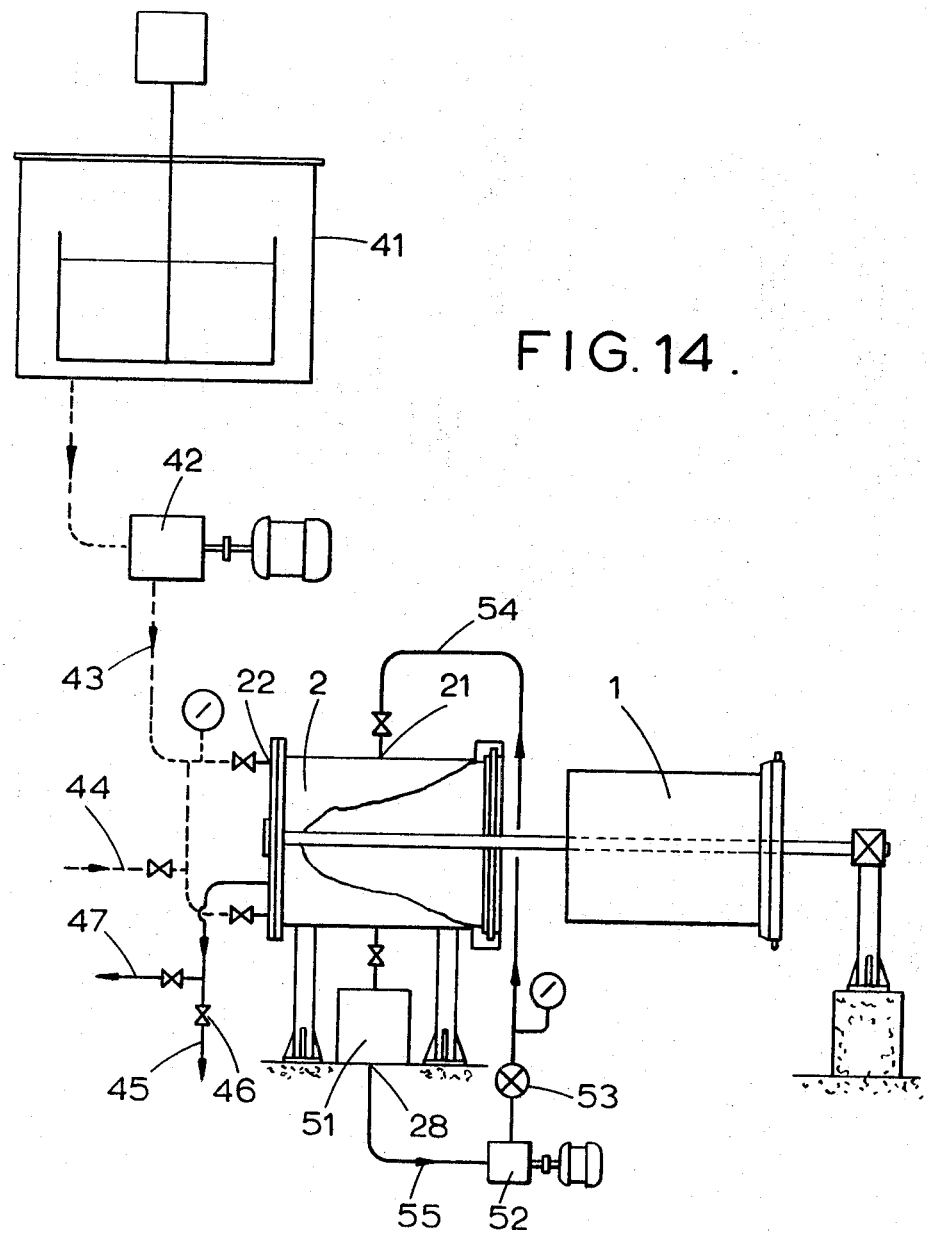
FIG. 14 is a highly diagrammatic layout of a hydraulic system, including the apparatus of FIGS. 1 to 9.

FIG. 14 shows a feed system for the filter slurry which includes a slurry reservoir, a feed pump 42 and a valved conduit 43 from the pump 42 to the pair of inlets 22 to the annular space. An alternative inlet 44 for wash liquor also provided with a valve is connected to the conduit 43 feeding the space 13. A drainage conduit 45 leads away from the drainage port 23 in the end plate 8 of the housing 2 and is also provided with a shutoff valve 46. A branch conduit 47 also valved, is provided prior to the shutoff valve 46 in the line of flow.

Instead of the pressure system for feeding slurry to the apparatus feeding may be done by gravity when desired.

The arrangement for inwardly deforming the diaphragm by external fluid pressure is normally a hydraulic system which includes a reservoir 51, a pump 52 with a pressure regulator 53 connected via conduit 54 to the inlets 21 and an outlet drainage conduit 55 feeding from outlets 28 in the wall of the housing 2 to the reservoir 51.

The apparatus briefly described above is operated as follows:

Slurry is pumped into the annular space 13 and liquid in the slurry drains through the filter cloth and the drainage ports 19 into the inside of the core 1 from which the liquid is discharged through the drainage aperture 23 in the end plate 8 of the housing. When the flow of liquid through the drainage outlet 23 ceases or appreciably slows down, the valves in the conduits 43, 44 and 47 are closed and the valves in the hydraulic pressure system are operated so as to exert pressure on the diaphragm 5 to deform it inwardly against the material within the annular space 13. This pressure compresses the mixture of solids and liquids in the space 13, and forces liquid from the solids in accordance with the pressure exerted so as to expel further liquid through the drainage ports 19 and the drainage outlet 23 from the housing. When this stage is considered complete, pressure is released by stopping the hydraulic pump 52 and opening the outlet valve in the system. The core 1 is then withdrawn from the housing 2 by axial outward movement along its support shaft 3. The core carries on its filter cloth a cake of compressed solids which may then be readily removed.

The filter cake can be repeatedly washed inside the apparatus with any desired liquid without prior removal and if necessary can be partly or completely dried by arranging for a current of a suitable gas at a convenient temperature and pressure to be blown through the cake. We normally wash the cake by supplying wash liquor through the branch line and the slurry inlets, the washings draining in the same way as filter liquid.

The branch line from the outlet conduit for collecting liquor when this is the desired product may also be used for back washing of the filter cloth.

The limits of the pressure applied are determined by the construction of the apparatus, but for general purpose a convenient pressure is in the range of 50—300 p.s.i.

If the apparatus is to be used for clarification, it may be necessary to precoat the filter cloth with a diatomaceous earth, carbon or other suitable filter aid; the clarified liquors are collected from the drainage port 23 in the end wall 8.

Whilst the apparatus has been made primarily for the filtration and clarification of compounds in the chemical industry in particular in the dyestuffs industry the invention is not limited to apparatus for that purpose. Apparatus according to the invention is capable of use in a variety of different industries, for example, pharmaceutical, jam and food, brewing, wine and spirit, wood pulp and paper, potter, sewage treatment and for the clarification, of river water.

The invention is further illustrated by the following examples, carried out in a filter with a core diameter of 4 feet.

EXAMPLE 1

After salting out a batch of 2-napthol-3, 6-disulphonic acid, the suspension is pumped into the filtration apparatus described above through the slurry inlet. The liquors drain through the filter cloth and are removed through the liquid outlet. When the drainage slows down, the slurry inlet is closed and a pressure of 120 p.s.i. is applied to the diaphragm through the hydraulic inlet. Further drainage takes place through the liquid outlet. When the drainage has slowed down or is complete, the hydraulic pressure is released by opening the drainage outlet and the core is withdrawn. The 2-naphthol-3, 6-disulphonic acid is removed from the filter cloth and is found to have a solids content of 61.5 percent. If the same batch size of 2-naphthol-3, 6-disulphonic acid is filtered on a normal plate and frame press, the solids content is found to be 35 percent.

EXAMPLE 2

If the 2- naphthol-3, 6-disulphonic acid in Example 1 is replaced with p-nitrochlorobenzene sulphonic acid, a product is obtained having a 75 percent solid content. The filtration of p-nitrochlorobenzene sulphonic acid on a tiled vacuum filter gives a product having a 45 percent solid content.

EXAMPLE 3

If the 2-naphthol-3, 6-disulphonic acid in Example 1 is replaced with Acid Yellow 17, a product is obtained having 60 percent solid content. The filtration of Acid Yellow 17 on a normal plate and frame press gives a product having 30 — 40 percent solids content.

The filter according to the invention has been tested on a wide range of chemicals including kieselguhr, magnesium carbonate, calcium carbonate and precipitated ferric hydroxide.

The filter is found to have a better filtration capacity than plate and frame-type filters and rotary vacuum filters operating under similar conditions.

The performance of the filter when used in clarification processes has been investigated; precoats of kieselguhr were applied to a cloth which has poor filtration characteristics when processing calcium carbonate. Successful removal of all the carbonate from dilute suspensions was effected by precoating. Distribution of the latter on the cylinder was uneven and it is recommended that where fast sedimenting suspensions are processed, the feedpipe should be situated at the base of the filter so that agitation of the suspension is maintained by the incoming slurry.

The action of pressing the cake is successful in some cases in producing a hard, fairly dry cake which is easily handled. Data on the drying characteristics of such cases are presented. One case examined, ($MgCO_3$), tended to reslurry itself after removal of the a applied pressure. This phenomenon is attributed to the close size range of the particles in the slurry; where fines are absent thixotropic behaviour of this kind may be expected, especially where hard, impervious particles are processed. In this case, filling the press to maximum capacity resulted in a situation where it was difficult to open the press. Again application of high pressures to compressible sludges such as ferric hydroxide resulted in forcing the particles through the cloth.

Two types of filter cake were studied in detail: a. kieselguhr, which is easily filterable, and b. precipitated calcium carbonate or whiting. The results collected are presented below in Table 1 and some data are examined in FIGS. 16 to 19 of the drawings.

Figure 15:
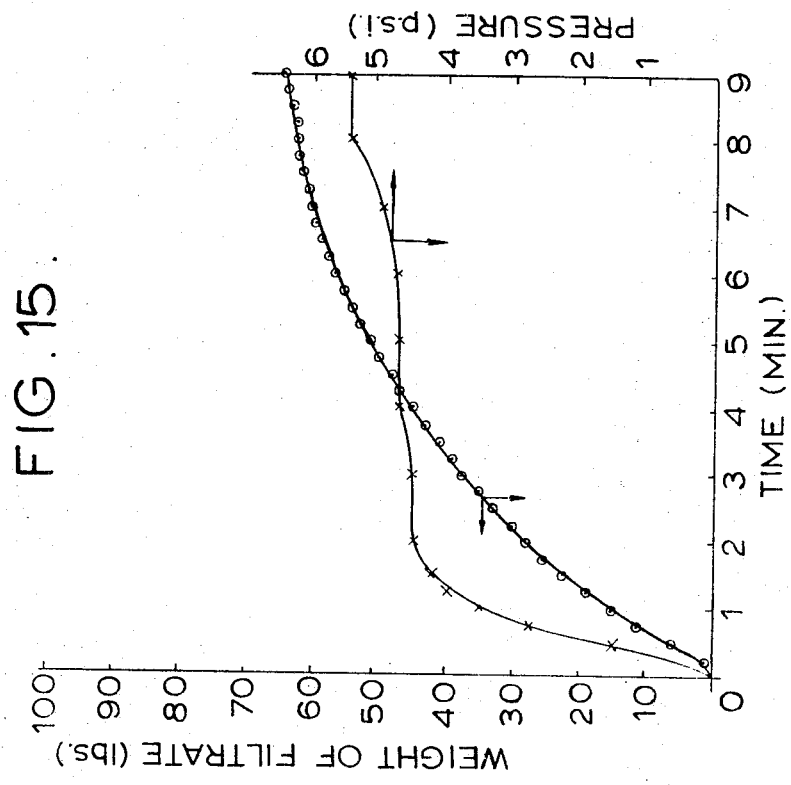

FIG. 15 depicts a typical run on calcium carbonate slurry; the weight of filtrate collected and the build-up of pressure on the filter are plotted versus time. The gradual reduction in filtration rate at a substantially constant pressure contrasts with the behaviour of kieselguhr; in the latter case, in runs 04—10 Table 1, the flow of filtrate was substantially constant whilst the pressure rose to a maximum. This change from pseudo-constant pressure behaviour to constant rate of flow is caused by the change in filtration characteristics of the slurry. It is of interest to be able to predict the behaviour of all types of cake in the machine.

Figure 16:
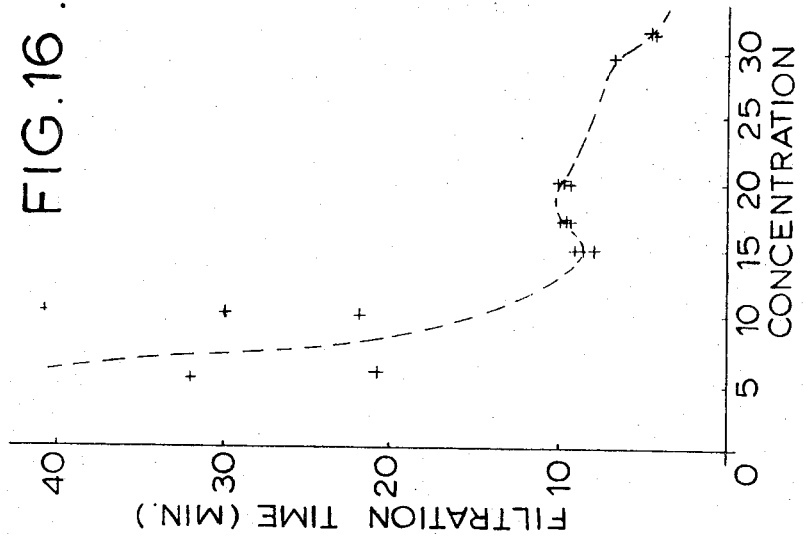
FIGS. 15 to 18 are graphs of the results of tests on an experimental filter.

FIG. 16 shows the effect of concentration on the time required to fill the press: no clearly defined minimum is indicated for SIZE A drum =(9⅝ inches Dia). It may be inferred, however, that operation with slurries of greater than 15 percent solids is desirable.

Whilst it may not be immediately of importance in certain chemical processes, the amount of moisture present in the cake after pressing is of great interest in other fields, especially where the filtrate is the desired component (beer, fruit juice, etc.)

Figure 17:
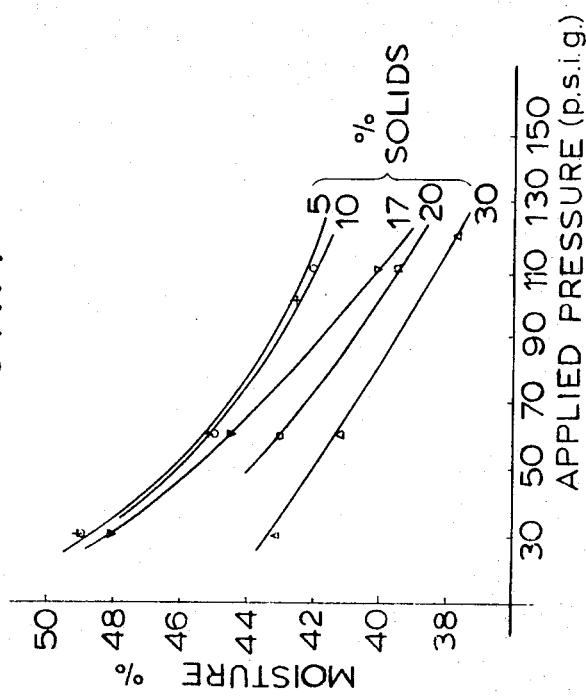

FIG. 17 shows the effect of applied pressure on $CaCO_3$ cakes. The moisture is determined by the pressure and the solids concentration. No minimum is in evidence and further tests have been made to measure the effect of pressings up to 500 p.s.i.

Figure 18:
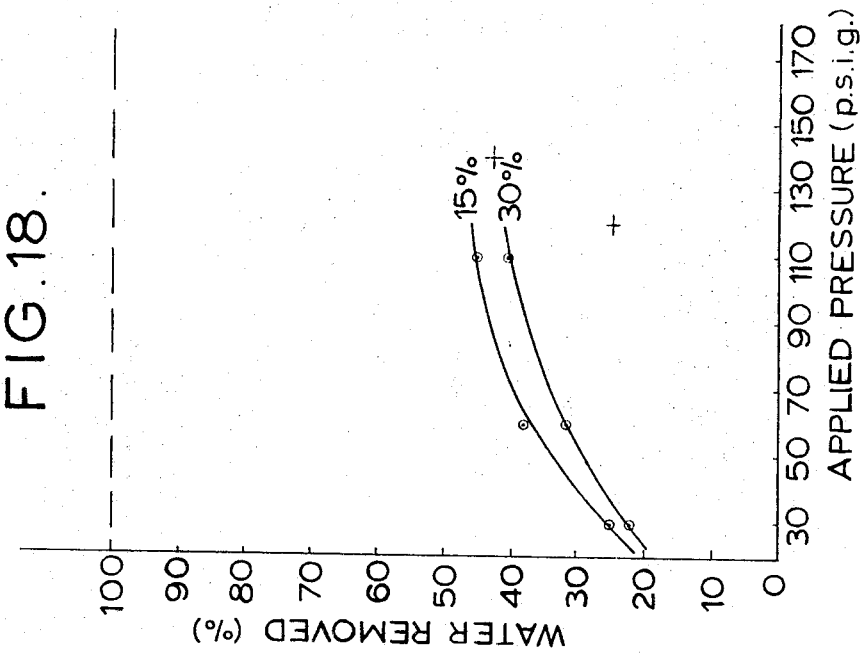

In FIG. 18, the percentage of water removed by pressing is plotted against applied pressure. The possibility exists of producing very dry cakes at reasonable pressures for slurries of moderate concentrations.

Further work has included studies on slurries of various filterabilities and on drums of various diameters.

TABLE
[Filter Drum Diameter=9⅝"]

| Run | Material | Solids concn., lb./100 lb. slurry | Wet cake yield, lb. | Filtration time (mins.) | Applied air pressure, lbs./sq. in. | Expressed water, lbs. | Cake moisture (percent) by weight | Initial filtration ratio, lb./min. |
|---|---|---|---|---|---|---|---|---|
| 04 | Kieselguhr | 10 | 32.0 | 2.5 | ¹ 87 | 4.75 | 59.5 | 0 |
| 05 | do | 10 | 28.0 | 3.8 | ¹ 80 | 3.75 | 58.0 | 45 |
| 06 | do | 10 | 32.5 | 3.6 | ¹ 107 | 3.00 | 55.5 | 24. |
| 07 | do | 12 | 29.0 | 6.0 | ¹ 95 | 3.00 | 57.1 | 24.25 |
| 08 | do | 13 | 32.0 | 10.0 | ¹ 93 | 5.00 | 59.5 | 21.25 |
| 09 | do | 5 | 27.0 | 14.0 | 110 | 5.50 | 57.5 | 14.0 |
| 10 | do | 5 | 22.5 | 11.0 | 40 | 5.75 | 57.0 | 14.5 |
| 11 | Calc. carbonate | 5.8 | 27.0 | 21.0 | 125 | 12.0 | 42.0 | 18.5 |
| 12 | do | 5.1 | 31.5 | 31.0 | 60 | 9.0 | 45.0 | 24.25 |
| 13 | do | 10.1 | 30.5 | 30.0 | 95 | 10.4 | 42.5 | 16.75 |
| 14 | do | 10.1 | 32.0 | 22.0 | 60 | 9.25 | 45.5 | 16.0 |
| 15 | do | 10.5 | 35.25 | 41.0 | 30 | 5.75 | 49.0 | 13.25 |
| 16 | do | 14.9 | 29.5 | 8.5 | 110 | 11.25 | 42.0 | 15.5 |
| 17 | do | 14.9 | 28.0 | 8.0 | 60 | 7.75 | 45.0 | 12.5 |
| 18 | do | 14.9 | 31.75 | 8.5 | 30 | 5.25 | 49.0 | 13.0 |
| 19 | do | 17.1 | 31.0 | 9.25 | 110 | 9.75 | 40.5 | 12.0 |
| 20 | do | 17.1 | 30.5 | 10.0 | 60 | 6.5 | 44.5 | 12.5 |
| 21 | do | 17.1 | 31.0 | 9.75 | 30 | 6.0 | 48.0 | 10.75 |
| 22 | do | 20.0 | 29.25 | 9.25 | 110 | 8.375 | 39.5 | 9.25 |
| 23 | do | 20.0 | 31.5 | 9.75 | 60 | 7.25 | 43.0 | 9.45 |
| 24 | do | 20.0 | 36.5 | 10.25 | 30 | 5.25 | 53.0 | 8.75 |
| 25 | do | 32.3 | 34.5 | 4.5 | 120 | 9.00 | 37.7 | 8.25 |
| 26 | do | 32.3 | 31.5 | 4.5 | 60 | 6.00 | 31.2 | 6.25 |
| 27 | do | 29.75 | 34.5 | 7.0 | 30 | 4.25 | 43.1 | 5.75 |
|  |  |  |  |  |  |  |  | 6.125 |

¹ Air applied gradually up to maximum.

The "Initial Filtration Rate" is a measurement carried out over the first minute on a new filter cloth to check for cloth blinding.

I claim:

1. A filtration apparatus for the separation of a solid medium from a liquid medium, the apparatus comprising a housing with an opening at one end thereof; a cylindrical inner wall for said housing; a shaft axially mounted within said housing, a cylindrical core with a longitudinal bore, means for slidably mounting the core on the shaft; said core being axially movable through said opening from an inoperative position outside said housing to an operative position within said housing in which an annular cavity is defined between said core and said inner wall; a flexible tube diaphragm within said housing located within said annular cavity, the ends of said diaphragm being sealably secured to the ends of said inner wall to provide a pressure chamber between said inner wall and the outside of said diaphragm and a filtration chamber defined by a wall apertured to permit the passage of liquids therethrough while retaining solids between the outside of said core and the inside of said diaphragm; closure means adapted to cooperate with said core and said housing at the ends of said inner wall and said core to produce pressure-tight peripheral seals at the ends of said filtration chamber in said operative position of said core; portions of said core defining drainage ports extending between said bore and the outside of said core; a first portion of said housing defining a liquid-solid inlet feeding into an end of said filtration chamber between said inside of said diaphragm and said outside of said core; a second portion of said housing defining a liquid outlet leading from an end of said bore within said core to the outside of said housing; a third portion of said housing defining a fluid inlet leading into said pressure chamber between said inner wall and said outside of said diaphragm; and a fourth portion of said housing defining a fluid outlet leading from said pressure chamber to said outside of said housing.

2. A filtration apparatus for the separation of a solid medium from a liquid medium, the apparatus comprising a housing with an opening at one end thereof; a cylindrical inner wall for said housing; a shaft axially mounted within said housing; a cylindrical core with a longitudinal bore, means for slidably mounting the core on the shaft, said core being axially movable through said opening from an inoperative position outside said housing to an operative position within said housing in which an annular cavity is defined between said core and said inner wall; a flexible tube diaphragm within said housing located within said annular cavity, the ends of said diaphragm being sealably secured to the ends of said inner wall to provide a pressure chamber between said inner wall and the outside of said diaphragm and a filtration chamber between the outside of said core and the inside of said diaphragm; said chamber being defined by a wall apertured to permit the passage of liquids therethrough while retaining solids; a first closure member at the leading end of said core which first enters within said housing when said core is moved from said inoperative position to said operative position; said first closure member being adapted to come into sealing contact with said housing when said core is in said operative position to thereby provide a first pressure-tight peripheral seal at one end of said filtration chamber; a second closure member at the trailing end of said core relative to said housing, said second closure member being adapted to come into sealing contact with said housing at the corresponding end of said housing when said core is in said operative position of said core to thereby provide a second peripheral seal at the other end of said filtration chamber; portions of said core defining drainage ports extending between said bore and the outside of said core; a first portion of said housing defining a liquid-solid inlet feeding into an end of said filtration chamber between said inside of said diaphragm and said outside of said core; a second portion of said housing defining a liquid outlet leading from one end of said bore within said core to the outside of said housing; a third portion of said housing defining a fluid inlet leading into said pressure chamber between said inner wall and said outside of said diaphragm; and a fourth portion of said housing defining a fluid outlet leading from said pressure chamber to said outside of said housing.

3. An apparatus according to claim 2 further comprising a body portion for each closure member fixed to said core and a deformable lip joined to said body portion but free from said core, said lip being adapted to come into sealing contact with a cooperating portion of said housing in said operative position of said core.

4. A method of separating a solid medium from a liquid medium comprising the steps of mounting a flexible tube diaphragm within a housing with a cylindrical inner wall and drainage ports between said bore and the outside of said core by securing the ends of said diaphragm to the ends of said inner wall in pressure-tight manner to define a pressure chamber between said inner wall and said diaphragm; mounting a cylindrical core with a longitudinal bore to be axially movable from an inoperative position outside said housing to an operative position within said housing in which an annular cavity open at one end is defined between said diaphragm and said core; a filtration chamber being defined between said core and said diaphragm in said operative position of said core; arranging closure means to cooperate with said core and said housing at the ends of said core and said inner wall to produce pressure-tight peripheral seals at the ends of said filtration chamber; providing a filter medium on the outside surface of said core; locating said core in its operative position; feeding the media to be separated into one end of said filtration chamber between said diaphragm and said core; allowing free drainage of liquid from said filtration chamber through said filter medium and said drainage ports in said core to a liquid outlet; feeding fluid under pressure into said pressure chamber to compress via said diaphragm the media in said filtration chamber to thereby force additional liquid medium through said filter medium and drainage ports to said liquid outlet, said solid medium being retained by said filter medium; releasing pressure in said pressure chamber when a desired amount of liquid has been filtered off under pressure; and moving said core with its adhering solid medium to said inoperative position thereof to allow recovery of said solid medium.